(12) United States Patent
Wang et al.

(10) Patent No.: US 8,485,711 B2
(45) Date of Patent: Jul. 16, 2013

(54) LIGHT PLATE

(75) Inventors: Wei-Chih Wang, Hsinchu (TW);
Wei-Chun Yang, Hsinchu (TW);
Lei-Ken Hung, Hsinchu (TW)

(73) Assignee: Young Lighting Technology Inc. (TW)

( * ) Notice: Subject to any disclaimer, the term of this patent is extended or adjusted under 35 U.S.C. 154(b) by 499 days.

(21) Appl. No.: 12/801,031

(22) Filed: May 18, 2010

(65) Prior Publication Data

US 2010/0327769 A1    Dec. 30, 2010

(30) Foreign Application Priority Data

Jun. 26, 2009    (TW) ................................ 98121596 A

(51) Int. Cl.
*F21V 9/10* (2006.01)

(52) U.S. Cl.
USPC ........... 362/615; 362/619; 362/330; 362/555; 362/33

(58) Field of Classification Search
USPC ................. 362/615, 619, 612, 613, 330, 555, 362/559, 33, 231, 511
See application file for complete search history.

(56) References Cited

U.S. PATENT DOCUMENTS

| | | | |
|---|---|---|---|
| 6,508,564 B1 * | 1/2003 | Kuwabara et al. | 362/612 |
| 7,344,292 B2 * | 3/2008 | Kim | 362/612 |
| 7,572,045 B2 * | 8/2009 | Hoelen et al. | 362/628 |
| 2007/0279940 A1 | 12/2007 | Kim et al. | |
| 2010/0027293 A1 * | 2/2010 | Li | 362/619 |

FOREIGN PATENT DOCUMENTS

| | | |
|---|---|---|
| CN | 1932593 A | 3/2007 |
| JP | 2001184923 A | 7/2001 |
| TW | 530956 | 5/2003 |
| TW | M314819 | 7/2007 |
| TW | 200728866 A | 8/2007 |
| TW | 200801638 A | 1/2008 |
| TW | 200817781 A | 4/2008 |

OTHER PUBLICATIONS

Office action from TIPO dated Dec. 1, 2001 and translation.

* cited by examiner

*Primary Examiner* — Sharon Payne
(74) *Attorney, Agent, or Firm* — Bacon & Thomas, PLLC

(57) ABSTRACT

A light plate includes a light guide plate and four light source modules. The light source modules are disposed around the light guide plate. Each of the light source modules includes a first white light emitting element and a second white light emitting element. The first white light emitting element is capable of emitting a first white beam. The second white light emitting element disposed beside the first white light emitting element is capable of emitting a second white beam. The first white light emitting elements of the light source modules are mirror-symmetrical with respect to a first reference plane and a second reference plane. The second white light emitting elements of the light source modules are mirror-symmetrical with respect to the first reference plane and the second reference plane. The correlated color temperature (CCT) of the first white beam is greater than the CCT of the second white beam.

14 Claims, 5 Drawing Sheets

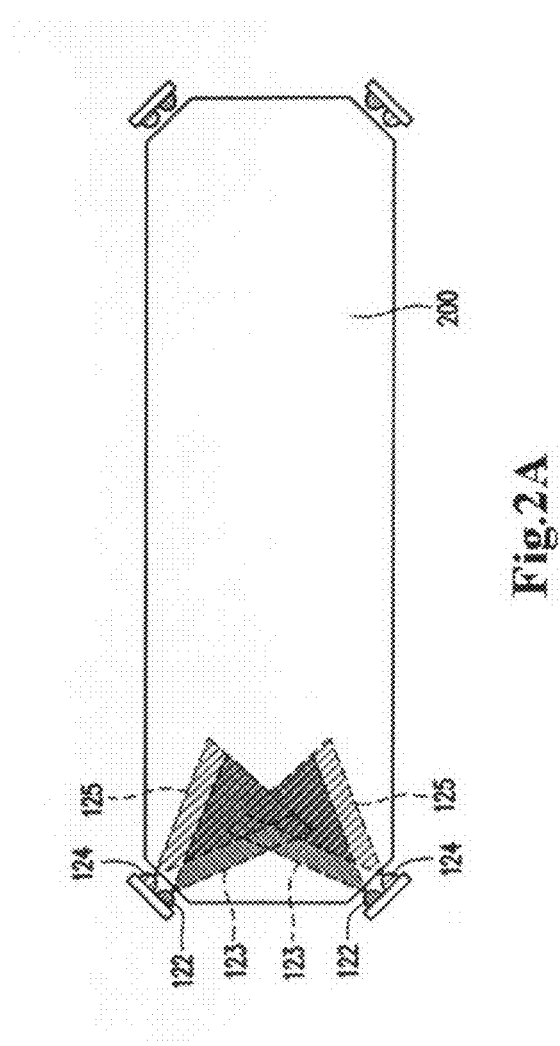

LIGHT PLATE

CROSS-REFERENCE TO RELATED APPLICATION

This application claims the priority benefit of Taiwan application serial no. 98121596, filed on Jun. 26, 2009. The entirety of the above-mentioned patent application is hereby incorporated by reference herein and made a part of this specification.

BACKGROUND OF THE INVENTION

1. Field of the Invention

The invention relates to an illumination module, and more particularly, to a light plate.

2. Description of Related Art

A desk lamp is generally used for working and studying such as reading, writing, and designing. For people who work at their desks, good illumination environment may improve the quality of studying and working, increase the working efficiency, and protect eyes. The major light source of a conventional desktop lamp is incandescent lamp or fluorescent lamp. However the incandescent lamps have disadvantages of more heat generation, larger power consumption, lower light emitting efficiency, and shorter service life, and the power consumption, light emitting efficiency, and service life of the fluorescent lamps need to be improved.

The light emitting diode (LED) is an ideal light source for environment protection. Comparing with incandescent lamp and fluorescent lamp, the light emitting diode has advantages in power saving and service life. The Taiwan patent No. 530956 and No. M314819, the Taiwan publication No. 200746469 and the US publication No. 20080049445 disclose a light source apparatus adopting the light emitting diode as the light source.

Since the LED is a point light source, when the LED is used as the light source of the desk lamp, a plurality of LEDs are needed to be arrayed on a plane to achieve the effect of the surface light source. However, when the LEDs are arrayed incompactly, dark area generates between the adjacent LEDs thereby. Additionally, even thought the LEDs are arrayed compactly, the ghost image may still generate, so that the user's eyes may feel uncomfortable. Furthermore, the point light source is easy to be glare, and it may make the image obscure, cause the difficulty of reading, make eyes tired easily, make reading efficiency low, and make eyes painful. Furthermore, the colour temperature of the light emitting colour of the conventional LED desk lamp and as a result may not be used in many kinds of situations.

SUMMARY OF THE INVENTION

The invention provides a light plate, capable of providing a light source with uniform illumination and color temperature.

The other objectives and advantages may be further understood from the disclosures of the invention.

To achieve at least one of or other objectives, one embodiment of the invention provides a light plate including a light guide plate and four light source modules. The light guide plate has a first surface, a second surface opposite to the first surface, and a side surface connecting to the first surface and the second surface. These light source modules are disposed beside the side surface and around the light guide plate. Each of the light source modules comprises a first white light emitting element and a second white light emitting element. The first white light emitting element is capable of emitting a first white beam. The second white light emitting element is disposed beside the first white light emitting element and capable of emitting a second white beam. These first white light emitting elements of the light source modules are mirror-symmetrical with respect to a first reference plane and a second reference plane, these second white light emitting elements of the light source modules are mirror-symmetrical with respect to the first reference plane and the second reference plane, and a correlated color temperature (CCT) of the first white beams is greater than a correlated color temperature (CCT) of the second white beams.

In one embodiment of the invention, the first reference plane is perpendicular to the second reference plane substantially. Each of the first reference plane and the second reference plane is a mirror-symmetrical plane of the light guide plate. The side surface includes four light incident surfaces, the four light incident surfaces are disposed on four corners of the light guide plate respectively, the four light source modules are disposed beside the four light incident surfaces respectively, and the first white beam and the second white light beam respectively emitted by the first white light emitting element and the second white light emitting element of each of the light source modules are capable of entering the light guide plate through one of the light incident surfaces. The side surface further includes four connecting surfaces, the four connecting surfaces are disposed on four sides of the light guide plate respectively, and each of the connecting surfaces is connected to two adjacent light incident surfaces.

In one embodiment of the invention, the above-mentioned four connecting surfaces includes two opposite long connecting surfaces and two opposite short connecting surfaces. A length of each of the long connecting surfaces along a direction parallel to the first surface is longer than a length of each of the short connecting surfaces along the direction parallel to the first surface. In each of the light source modules, the first white light emitting element is closer to the short connecting surface adjacent to the light source module than the second white light emitting element, and the second white light emitting element is closer to the long connecting surface adjacent to the light source module than the first white light emitting element.

In one embodiment of the invention, these first white beams and these second white beams are capable of mixing together in the light guide plate for forming an emitting light beam from the first surface. The light plate further includes a control unit, and the control unit is electrically connected to the light source modules. The control unit is capable of adjusting a ratio of a driving current of each of the first white light emitting elements to each of the second white light emitting elements for changing the CCT of the emitting light beam.

In one embodiment of the invention, the control unit is capable of adjusting a ratio of a driving time of each of the first white light emitting elements to each of the second white light emitting elements for changing the CCT of the emitting light beam. In one embodiment of the invention, the control unit is capable of adjusting a driving current of each of the first white light emitting elements and each of the second white light emitting elements for changing an intensity of the emitting light beam. In one embodiment of the invention, the control unit is capable of adjusting a driving time of each of the first white light emitting elements and each of the second white light emitting elements for changing an intensity of the emitting light beam.

In one embodiment of the invention, the light plate further includes an optical film assembly and the optical film assembly is disposed on the first surface of the light guide plate. The optical film assembly may include at least one of a brightness enhancement sheet and a diffusion sheet. The light plate further includes a reflection sheet, the reflection sheet is disposed beside the second surface of the light guide plate, and the reflection sheet is capable of reflecting the first white beam and the second white beam from the second surface to the light guide plate. Each of the light source modules further includes a circuit board, wherein the first white light emitting element and the second white light emitting element of the light source module are disposed on the circuit board and are electrically connected to the circuit board.

In one embodiment of the invention, each of the circuit boards has a symmetrical surface substantially perpendicular to the first surface and has a first side and a second side mirror-symmetrical with respect to the symmetrical surface. In each of the light source modules, a position of the first white light emitting elements and a position of the second white light emitting elements are mirror-symmetrical with respect to the symmetrical surface, the first white light emitting element is disposed between the first side and the symmetrical surface, the second white light emitting element is disposed between the second side and the symmetrical surface, a distance between the first white light emitting element and the symmetrical surface is shorter than a distance between the first light emitting element and the first side, and a distance between the second white light emitting element and the symmetrical surface is shorter than a distance between the second white light emitting element and the second side.

In one embodiment of the invention, each of the first white light emitting elements is, for example, a white light emitting diode, each of the second white light emitting elements is, for example, an amber light emitting diode, and each of the second white beams is, for example, an amber beam.

In the light plate of the embodiment of the invention, since the first white light emitting element with high light emitting colour temperature is mirror-symmetrical with respect to the first reference plane and the second reference plane, and the second white light emitting element with low light emitting colour temperature is mirror-symmetrical with respect to the first reference plane and the second reference plane, the light plate may provide a surface light source with uniform illumination and colour temperature.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A is a mixing light beam diagram of the light plate in FIG. 1A.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

In the specification, the white beam not only means a pure white beam, but also includes blue white beam with high correlated color temperature (CCT) and the yellow white beam with low CCT. For example, when the CCT of the white beam is low (for example, the CCT is 2500K), the white beam with low CCT is amber beam.

Figure 1A:
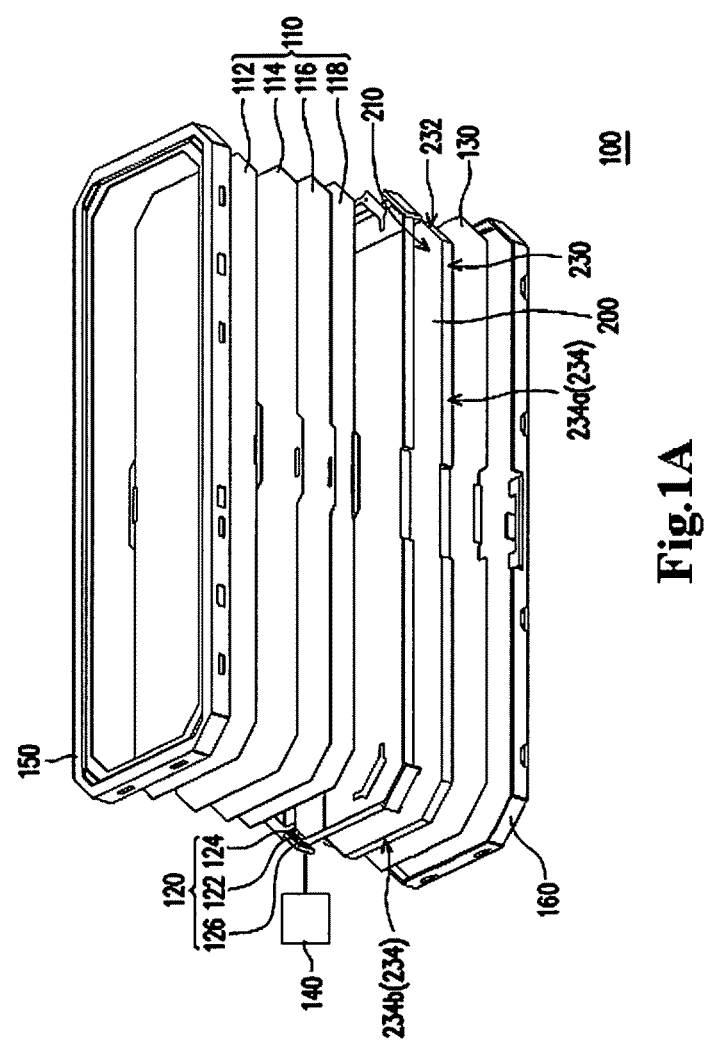
FIG. 1A is an explosion diagram of a light plate of the invention.
Figure 1B:
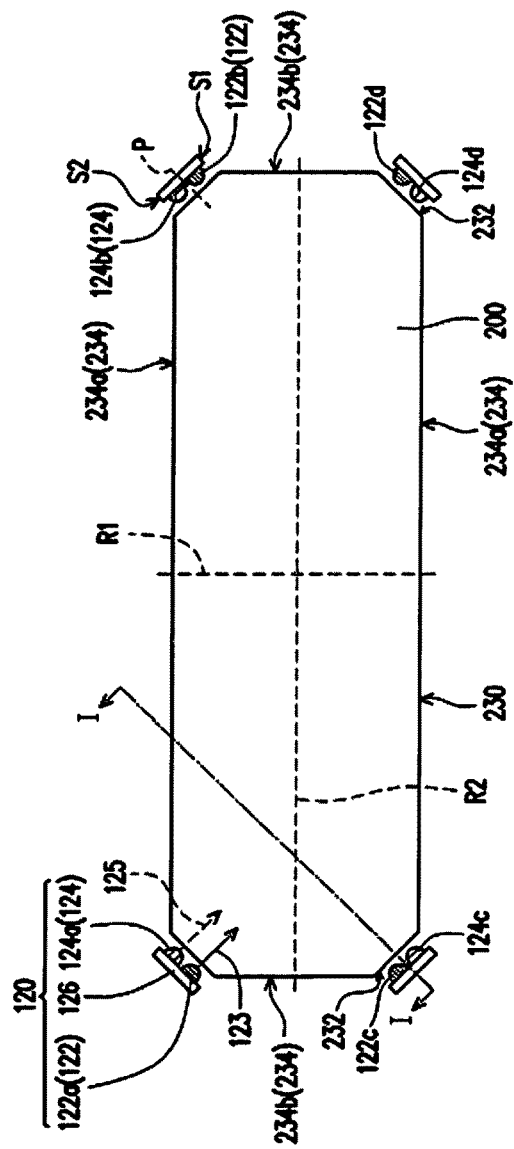
FIG. 1B is a top view of the light guide plate and the four light source modules in FIG. 1A.
Figure 1C:
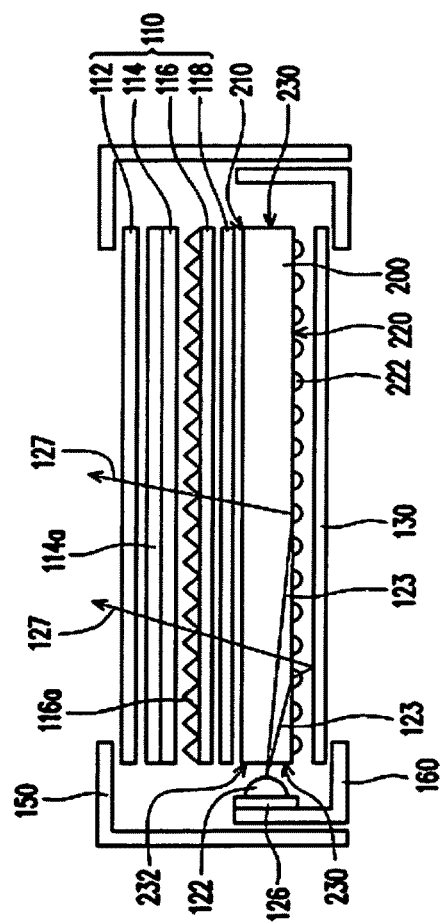
FIG. 1C is a cross-sectional diagram of the light plate of FIG. 1B along line I-I.

Please refer to FIGS. 1A to 1C, the light plate 100 of the embodiment is adapted to a desk lamp or other lamps. The light plate 100 includes a light guide plate 200 and four light source modules 120. The light guide plate 200 includes a first surface 210, a second surface 220 opposite to the first surface 210, and a side surface 230 connecting to the first surface 210 and the second surface 220. These light source modules 120 are disposed beside the side surface 230 and around the light guide plate 200. Each of the light source modules 120 includes a first white light emitting element 122 and a second white light emitting element 124. The first white light emitting element 122 is capable of emitting a first white beam 123 toward the light guide plate 200. The second white light emitting element 124 is disposed beside the first white light emitting element 122 and capable of emitting a second white beam 125 toward the light guide plate 200. In the embodiment, the first white light emitting element 122 and the second white light emitting element 124 are, for example, both light emitting diodes.

These first white light emitting elements 122 of the light source modules 120 are mirror-symmetrical with respect to a first reference plane R1 and a second reference plane R2, these second white light emitting elements 124 of the light source modules 120 are mirror-symmetrical with respect to the first reference plane R1 and the second reference plane R2. To be specific, the first white light emitting element 122a and the first white light emitting element 122b are mirror-symmetrical with respect to the first reference plane R1, the first white light emitting element 122c and the first white light emitting element 122d are mirror-symmetrical with respect to the first reference plane R1, the first white light emitting element 122a and the first white light emitting element 122c are mirror-symmetrical with respect to the second reference plane R2, and the first white light emitting element 122b and the first white light emitting element 122d are mirror-symmetrical with respect to the second reference plane R2. Additionally, the second white light emitting element 124a and the second white light emitting element 124b are mirror-symmetrical with respect to the first reference plane R1, the second white light emitting element 124c and the second white light emitting element 124d are mirror-symmetrical with respect to the first reference plane R1, the second white light emitting element 124a and the second white light emitting element 124c are mirror-symmetrical with respect to the second reference plane R2, and the second white light emitting element 124b and the second white light emitting element 124d are mirror-symmetrical with respect to the second reference plane R2.

Additionally, the CCT of the first white beams 123 is greater than the CCT of the second white beams 125. For example, each of the first white light emitting elements 122 is a white LED, each of the first white light emitting elements 124 is an amber LED, and each of the second white beam 125 is an amber beam. In the embodiment, the CCT of first white beam 123 is, for example, 2500K, that is, the second white beam 125 is an amber beam.

In the embodiment, each of the light sources 120 may further include a circuit board, wherein the first white light emitting element 122 and the second white light emitting element 124 are disposed on the circuit board 126 and are electronically connected to the circuit board 126.

In the embodiment, the first reference plane R1 is perpendicular to the second reference plane R2 substantially. Each of the first reference plane R1 and the second reference plane R2 is a mirror-symmetrical plane of the light guide plate 200. The side surface 230 includes four light incident surfaces 232, the four light incident surfaces 232 are disposed on four corners of the light guide plate 200 respectively, and the four light source modules 120 are disposed beside the four light incident surfaces 232 respectively. The first white beam 123 and the second white light beam 125 respectively emitted by the first white light emitting element 122 and the second white light emitting element 124 of each of the four light source modules 120 enter the light guide plate 200 through one of the light incident surfaces 232. The side surface 230 further includes four connecting surfaces 234, the four connecting surfaces 234 are disposed on four sides of the light guide plate 200 respectively, and each of the connecting surfaces 234 is connected to two adjacent light incident surfaces 232.

In the embodiment, the above-mentioned four connecting surfaces 234 include two opposite long connecting surfaces 234a and two opposite short connecting surfaces 234b. A length of each of the long connecting surfaces 234a along a direction parallel to the first surface 210 is longer than a length of each of the short connecting surfaces 234b along the direction parallel to the first surface 210. In each of the light source modules 120, the first white light emitting element 122 is closer to the short connecting surface 234b adjacent to the light source module 120 than the second white light emitting element 124, and the second white light emitting element 124 is closer to the long connecting surface 234a adjacent to the light source module 120 than the first white light emitting element 122. However, in other embodiments, the first white light emitting element 122 may be closer to the long connecting surface 234a, and the second white light emitting element 124 is closer to the short connecting surface 234b.

In the embodiment, the light plate 100 further includes a reflection sheet 130, the reflection sheet 130 is disposed beside the second surface 220 of the light guide plate 200, and the reflection sheet 130 is capable of reflecting the first white beam 123 and the second white beam 125 from the second surface 220 to the light guide plate 200. To be specific, when the first white beam 123 or the second white beam 125 is transmitted to the microstructure 222 of the second surface 220, a part of the first white beam 123 or the second white beam 125 is transmitted through the microstructure 222 and is transmitted to the reflector 130, then is reflected by the reflector 130 and is transmitted through the second surface 220 and the first surface 210 in sequence. In addition, the first white beam 123 and the second white beam 125 may also be reflected by other part of the microstructure 222 and be transmitted through the first surface 210. In this way, the surface light source is formed on the first surface 210 of the light guide plate 200. To be specific, these first white beams 123 and the second white beams 125 are mixed in the light guide plate to form an emitting light beam 127 from the first surface 210.

In the light plate 100 of the embodiment, since the first white light emitting element 122 with higher light emitting colour temperature is mirror-symmetrical with respect to the first reference plane R1 and the second reference plane R2, and the second white light emitting element 124 with lower light emitting colour temperature is mirror-symmetrical with respect to the first reference plane R1 and the second reference plane R2, the light plate 100 may provide a light source with uniform illumination and colour temperature.

Figure 2B:
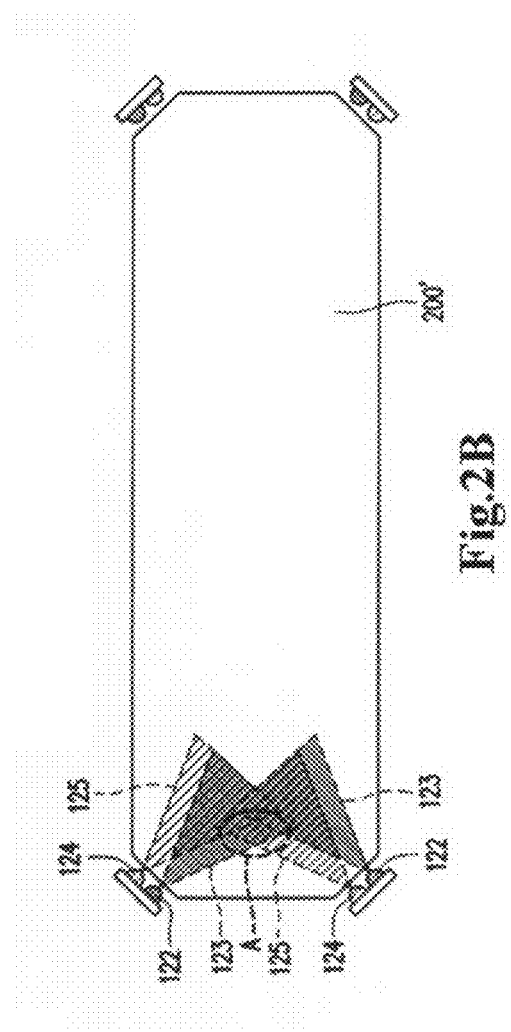
FIG. 2B is a mixing light beam diagram in the light plate of the light emitting elements with different colour temperature disposed non-mirror-symmetrically.

The positions of the first white light emitting elements 122 and the second white light emitting elements 124 in the bottom left of FIG. 2B are reversed of FIG. 2A, but the positions of the first white light emitting elements 122 and the second white light emitting elements 124 in the top left of FIG. 2B are the same as the positions in FIG. 2A. Comparing FIG. 2A with FIG. 2B, the mixed light beam of the light guide plate 200 in FIG. 2A is more uniform and symmetrical than the mixed light beam of the light guide plate 200' in FIG. 2B, as described in FIG. 2B, the A area in light guide plate 200' generates colour offset phenomenon, and the colour offset phenomenon results from the non-mirror-symmetry of the light emitting devices with different colour temperature. Therefore, as the FIGS. 2A and 2B proofed, the embodiment adopting mirror symmetry disposition of the first white light emitting element 122 and the second white light emitting element 124 may improve the uniformity of the illumination and the colour temperature of the surface light source provided by the light plate 100.

Please refer to FIGS. 1A to 1C, to further improve the uniformity and the illumination of the surface light source, the light plate 100 further includes an optical film assemble 110 and the optical film assembly 110 is disposed on the first surface 210 of the light guide plate 200. The optical film assembly 110 may include at least one of a brightness enhancement sheet and a diffusion sheet. In the embodiment, the optical film assembly 110 includes a top diffuser 112, a first prism sheet 114, a second prism sheet 116, and a bottom diffuser 118. Top diffuser 112 is disposed on the first surface 210 of the light guide plate 200, the first prism sheet 114 is disposed between the top diffuser 112 and the first surface 210, the second prism sheet 116 is disposed between the first prism sheet 114 and the first surface 210, and the bottom diffuser 118 is disposed between the second prism sheet 116 and the first surface 210, wherein the prism rod 114a on the first prism sheet 114 and the prism rod 116a on the second prism sheet 116 are substantially perpendicular to each other. The top diffuser 112 and the bottom diffuser 118 may improve the uniformity of the surface light source, and the first prism sheet 114 and the second prism sheet 116 may improve the illumination of the surface light source by minimizing the scatter angle of the light emitting beam 127.

Moreover, the light plate 100 further includes a front frame 150 and a back frame 160 to grip and fix the reflector 130, the light guide plate 200, and the optical film assembly 110 and to cover the light source module 120.

In the embodiment, the light plate 100 further includes a control unit 140 (as shown in FIG. 1), and the control unit 140 is electrically connected to the light source modules 120. The control unit 140 is, for example, a control circuit and the control unite 140 is capable of adjusting a ratio of a driving current of each of the first white light emitting elements 122 to each of the second white light emitting elements 124 for changing the CCT of the emitting light beam 127. Additionally, in the embodiment or another embodiment, the control unit 140 may also adjust a ratio of a driving time (for example the working time in one period) of each of the first white light emitting elements 122 to each of the second white light emitting elements 124 for changing the CCT of the emitting light beam 127. In the embodiment, the control unit 140 is capable of adjusting a driving current of each of the first white light emitting elements 122 and each of the second white light emitting elements 124 for changing the intensity of the emitting light beam 127. In addition, in the embodiment or another embodiment, the control unit 140 may also adjust a driving time of each of the first white light emitting elements 122 and each of the second white light emitting elements 124 for changing the intensity of the emitting light beam 127. In this way, the light plate 100 of the embodiment may adjust the CCT and the illumination of the surface light source according to the different using conditions and different using demands. In the embodiment, the light plate 100 may adjust the CCT of the surface light source from 2500K to 6500K continuously.

In the embodiment, each of the circuit boards 126 has a symmetrical surface P substantially perpendicular to the first surface 210 and has a first side S1 and a second side S2 mirror-symmetrical with respect to the symmetrical surface P. In each of the light source modules 120, a position of the first white light emitting elements 122 and a position of the second white light emitting elements 124 are mirror-symmetrical with respect to the symmetrical surface P, the first white light emitting element 122 is disposed between the first side S1 and the symmetrical surface P, the second white light emitting element 124 is disposed between the second side S2 and the symmetrical surface P, a distance between the first white light emitting element 122 and the symmetrical surface P is shorter than a distance between the first light emitting element 122 and the first side S1, and a distance between the second white light emitting element 124 and the symmetrical surface P is shorter than a distance between the second white light emitting element 124 and the second side S2. In other word, in each light source module 120, the first white light emitting element 122 is close to the second white light emitting element 124, so that the mixed-light distance between the first white light beam 123 and the second white light beam 125 may be shortened. Thereby, the uniformity of the colour temperature and the illumination of the surface light source may be improved.

The following Table 1 lists the actual measuring data of the light plate 100 of the embodiment.

TABLE 1

| CCT | Power consumption of the light source module (W) | Power consumption of the light plate (W) | Centre illumination 0.5 m away from light plate (Lux) |
|---|---|---|---|
| 6500 K | 7.9 | Less than 10 | 1400 |
| 2500 K | 6.1 | Less than 8 | 900 |

According to the experimental data of Table 1, the light plate 100 of the embodiment has good utilization efficiency for energy, and may provide the surface light source with sufficient illumination. Therefore, the light plate 100 is adapted to desk lamps or other lamp apparatuses to provide good illumination environment for users. Additionally, the first white beam 123 and the second white light beam 125 respectively emitted by the first white light emitting element 122 and the second white light emitting element 124 of the light plate 100 may not emit to the user's eyes directly, but emit through the light guide plate 200 and form the surface light source, so the light plate 100 may improve the problem of glare effectively.

Above all, the embodiment or the embodiments of the invention may have at least one of the following advantages, in the light plate of the embodiment of the invention, since the first white light emitting element with higher light emitting colour temperature is mirror-symmetrical with respect to the first reference plane and the second reference plane, and the second white light emitting element with lower light emitting colour temperature is mirror-symmetrical with respect to the first reference plane and the second reference plane, the light plate may provide a surface light source with uniform illumination and colour temperature. Additionally, in the light plate of the embodiment of the invention, the control unit may adjust the driving current of each the first white light emitting elements and each the second white light emitting elements and adjust the driving time of each the first white light emitting elements and each the second white light emitting elements to change the intensity and the CCT of the light emitting beam, so as to adjust the intensity and the CCT of the surface light source providing by the light plate.

The foregoing description of the preferred embodiments of the invention has been ed for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A light plate, comprising:
   a light guide plate, having a first surface, a second surface opposite to the first surface, and a side surface connecting to the first surface and the second surface; and four light source modules, disposed beside the side surface and around the light guide plate, wherein each of the light source modules comprises:
   a first white light emitting element, capable of emitting a first white beam; and
   a second white light emitting element, disposed beside the first white light emitting element and capable of emitting a second white beam;
   wherein the first white light emitting elements of the light source modules are mirror-symmetrical with respect to a first reference plane and a second reference plane, the second white light emitting elements of the light source modules are mirror-symmetrical with respect to the first reference plane and the second reference plane, and a correlated color temperature of the first white beams is greater than a correlated color temperature of the second white beams;
   wherein the side surface comprises four light incident surfaces disposed on four corners of the light guide plate respectively, the four light source modules are disposed beside the four light incident surfaces respectively, and the first white beam and the second white light beam respectively emitted by the first white light emitting element and the second white light emitting element of each of the four light source modules are capable of entering the light guide plate through one of the light incident surfaces; and
   wherein each of the light source modules further comprises a circuit board, and the first white light emitting element and the second white light emitting element of the light source module are disposed on the circuit board and electrically connected to the circuit board and the arrangement direction of the first white light emitting element and the second white light emitting element are parallel to the first surface of the light guide plate.

2. The light plate according to claim 1, wherein the first reference plane is perpendicular to the second reference plane substantially.

3. The light plate according to claim 2, wherein each of the first reference plane and the second reference plane is a mirror-symmetrical plane of the light guide plate.

4. The light plate according to claim 1, wherein the side surface further comprises four connecting surfaces disposed on four sides of the light guide plate respectively, and each of the connecting surfaces is connected to two adjacent light incident surfaces.

5. The light plate according to claim 4, wherein the four connecting surfaces comprise two opposite long connecting surfaces and two opposite short connecting surfaces, a length of each of the long connecting surfaces along a direction parallel to the first surface is longer than a length of each of the short connecting surfaces along the direction parallel to the first surface, in each of the light source modules, the first white light emitting element is closer to the short connecting surface adjacent to the light source module than the second white light emitting element, and the second white light emitting element is closer to the long connecting surface adjacent to the light source module than the first white light emitting element.

6. The light plate according to claim 1, wherein the first white beams and the second white beams are capable of mixing together in the light guide plate for forming an emitting light beam from the first surface, the light plate further comprises a control unit electrically connected to the light source modules, the control unit is capable of adjusting a ratio of a driving current of each of the first white light emitting elements to each of the second white light emitting elements for changing the correlated color temperature of the emitting light beam.

7. The light plate according to claim 1, wherein the first white beams and the second white beams are capable of mixing together in the light guide plate for forming an emitting light beam from the first surface, the light plate further comprises a control unit electrically connected to the light source modules, control unit is capable of adjusting a ratio of a driving time of each of the first white light emitting elements to each of the second white light emitting elements for changing the correlated colour temperature of the emitting light beam.

8. The light plate according to claim 1, wherein the first white beams and the second white beams are capable of mixing together in the light guide plate for forming an emitting light beam from the first surface, the light plate further comprises a control unit electrically connected to the light source modules, control unit is capable of adjusting a driving current of each of the first white light emitting elements and each of the second white light emitting elements for changing an intensity of the emitting light beam.

9. The light plate according to claim 1, wherein the first white beams and the second white beams are capable of mixing together in the light guide plate for forming an emitting light beam from the first surface, the light plate further comprises a control unit electrically connected to the light source modules, the control unit is capable of adjusting a driving time of each of the first white light emitting elements and each of the second white light emitting elements for changing an intensity of the emitting light beam.

10. The light plate according to claim 1, further comprising an optical film assembly disposed on the first surface of the light guide plate.

11. The light plate according to claim 10, wherein the optical film assembly comprises at least one of a brightness enhancement sheet and a diffusion sheet.

12. The light plate according to claim 1, further comprising a reflection sheet disposed beside the second surface of the light guide plate, and the reflection sheet is capable of reflecting the first white beam and the second white beam from the second surface to the light guide plate.

13. The light plate according to claim 1, wherein each of the circuit boards comprises a symmetrical surface substantially perpendicular to the first surface and having a first side and a second side mirror-symmetrical with respect to the symmetrical surface, in each of the light source modules, a position of the first white light emitting elements and a position of the second white light emitting element are mirror-symmetrical with respect to the symmetrical surface, the first white light emitting element is disposed between the first side and the symmetrical surface, the second white light emitting element is disposed between the second side and the symmetrical surface, a distance between the first white light emitting element and the symmetrical surface is shorter than a distance between the first light emitting element and the first side, and a distance between the second white light emitting element and the symmetrical surface is shorter than a distance between the second white light emitting element and the second side.

14. The light plate according to claim 1, wherein each of the first white light emitting elements is a light emitting diode, each of the second white light emitting elements is a light emitting diode, and each of the second white beams is a yellow white beam.

* * * * *